(12) United States Patent
Stoiber et al.

(10) Patent No.: US 8,556,062 B2
(45) Date of Patent: Oct. 15, 2013

(54) GRIPPER UNIT FOR SUPPORTING AND TRANSPORTING ARTICLES

(75) Inventors: Christian Stoiber, Michelsneukirchen (DE); Thomas Spitzer, Wiesent (DE)

(73) Assignee: Krones AG, Neutraubling (DE)

( * ) Notice: Subject to any disclaimer, the term of this patent is extended or adjusted under 35 U.S.C. 154(b) by 365 days.

(21) Appl. No.: 12/807,179

(22) Filed: Aug. 30, 2010

(65) Prior Publication Data

US 2011/0064555 A1  Mar. 17, 2011

(30) Foreign Application Priority Data

Sep. 11, 2009 (DE) .................. 10 2009 043 984

(51) Int. Cl.
*B65G 47/90* (2006.01)
*B25J 15/00* (2006.01)

(52) U.S. Cl.
USPC ............... 198/470.1; 414/751.1; 294/86.4

(58) Field of Classification Search
None
See application file for complete search history.

(56) References Cited

U.S. PATENT DOCUMENTS

| | | | | |
|---|---|---|---|---|
| 3,884,363 A * | 5/1975 | Ajlouny | ........................ | 414/626 |
| 4,482,289 A | 11/1984 | Inaba et al. | | |
| 4,601,637 A | 7/1986 | Aviles et al. | | |
| 5,598,859 A | 2/1997 | Kronseder | | |
| 5,778,633 A | 7/1998 | Sweeny | | |
| 5,893,700 A | 4/1999 | Kronseder | | |
| 6,079,541 A | 6/2000 | Bercelli et al. | ........... | 198/377.03 |
| 6,264,419 B1 * | 7/2001 | Schinzel | .................. | 414/751.1 |
| 6,540,468 B1 * | 4/2003 | Blattner et al. | ......... | 414/416.08 |
| 7,261,199 B2 | 8/2007 | Hartness et al. | ........... | 198/470.1 |
| 7,278,451 B2 * | 10/2007 | Cavallari | ........................ | 141/83 |
| 2004/0065525 A1 | 4/2004 | Bonatti et al. | ........... | 198/377.07 |
| 2007/0256911 A1 | 11/2007 | Legallais et al. | | |
| 2007/0289665 A1 | 12/2007 | Mazzon et al. | ................. | 141/65 |
| 2009/0315281 A1 | 12/2009 | Tuauden et al. | | |
| 2010/0013253 A1 | 1/2010 | Winzinger et al. | | |

FOREIGN PATENT DOCUMENTS

| | | |
|---|---|---|
| CN | 2902981 | 5/2007 |
| DE | 28 20 315 | 11/1979 |
| DE | 297 13 510 U1 | 8/1998 |
| DE | 101 40 315 A1 | 3/2003 |
| DE | 10 2007 011923 | 9/2008 |
| DE | 20 2008 014089 | 1/2009 |
| EP | 0 795 500 | 9/1997 |

(Continued)

OTHER PUBLICATIONS

Statement re DE 297 13 510 U1, 1 page, Oct. 8, 1998.

*Primary Examiner* — Kavel Singh
(74) *Attorney, Agent, or Firm* — Davidson, Davidson & Kappel, LLC (57) ABSTRACT

A gripper unit for transport systems for supporting and transporting articles. A gripper unit that includes a gripper head with at least two gripper arms which can be opened and closed against each other. The top of the article to be gripped and to be transported is supported in the opening formed between the gripper arms. A shifting unit is supported in a flexible manner via a fastener directly supported at the transport system. Furthermore, the gripper unit is provided with a device for interchangeable support, adjustment and spatial determination of the gripper head in a first transport direction at the gripper unit. The device provides for the vertical movement of the gripper head contrary to the gripper unit and/or contrary to the transport system, which are arranged between the gripper head and the shifting unit or between the gripper head and the transport system.

16 Claims, 6 Drawing Sheets

(56) References Cited

FOREIGN PATENT DOCUMENTS

| EP | 0 854 102 B1 | 7/1998 |
| EP | 0 939 044 B1 | 9/2001 |
| EP | 2 138 431 | 12/2009 |
| FR | 2 867 171 | 9/2005 |
| WO | WO 2008/009828 | 1/2008 |
| WO | WO 2008/129347 A1 | 10/2008 |

* cited by examiner

GRIPPER UNIT FOR SUPPORTING AND TRANSPORTING ARTICLES

This claims the benefit of German Patent Application 10 2009 043 984.6, filed Sep. 11, 2009 and hereby incorporated by reference herein.

The present invention relates to a variable and interchangeable gripper unit for transporting articles, particularly bottles.

BACKGROUND

In the packaging industry, particularly with the production and filling of bottles, said bottles must be transferred from a first processing device to a second processing device at high speeds. For this purpose, transfer systems such as, for example, so called infeed and discharge starwheels with gripper heads are used, as shown in WO 2008/129347. The gripper heads grip the empty or already filled bottles at the neck below the upper opening, in fact preferably below the neck region where the bottles are provided with an enlargement. Generally, this is also known as 'neck handling'.

EP 0 939 044 B1 shows a bottle gripper with two grab arms, with contact faces for a control cam. Each contact face is part of an elastic pad fastened to the grab arm. The pad consists of an elastomeric material, and the contact face is of a low-wear material. The elastic pad is formed by a leaf spring bent about the grab arm, and held positively and in a removable manner in a holder in the grab arm. The grab arms are pivoted tongue-like about one or two pivot points, forming a grab section and an operating section.

DE 101 40 315 A1 shows a gripper for transporting plastic bottles. The gripper has two arms mounted on vertical pivots. The gripping surfaces contact the neck of the bottle at three or more points which lie in the same plane.

EP 0 854 102 B1 shows a container gripper, in particular for bottles, which is positionable on a movable part of a manipulating machine, and comprises a support structure internally carrying a pair of arms driven to rotate between a closed rest position in which they face each other to retain the container, and an open position in which they are withdrawn from each other to release the container; in this gripper the support structure comprises a U-shaped bracket supporting a limit stop.

U.S. Pat. No. 7,261,199 B1 shows a conveyor with grippers, which also grips the containers at the neck. The grippers are arranged at connected links and are positioned movable relative to their respective links for gripping a container by the neck of the container.

SUMMARY OF THE INVENTION

An object of the present invention is to provide a rapidly variable and interchangeable gripper unit.

The present invention provides a gripper unit for transport systems for supporting and transporting articles. The gripper unit can be installed, for example, at starwheel-shaped transport systems, wherein the starwheel-shaped transport systems serve for transferring articles, for instance blown containers such as empty or filled bottles, from a first processing device to a second processing device. Such infeed and discharge starwheels respectively are used, for example, between a blow-mold machine where bottles are made of preforms, and a filling station installed subsequently to said blow-mold machine. A further usage of such gripper units is to be found within blow-mold machines, wherein either preforms are inserted into the blow-mold or bottles are removed from the blow-mold.

A gripper unit according to the invention comprises a gripper head, wherein said gripper head is provided with at least two gripper arms which can be opened and closed against each other. The article to be gripped and transported is supported in the opening formed in between the gripper arms. Preferably, the top of the articles is supported. However, with a modified gripper unit also a support of the article to be transported is possible in the body region of said article.

The gripper unit comprises a shifting unit and/or a fastening means. The shifting unit can be directly or indirectly supported in a flexible manner at the transport system via a fastening means which is arranged in between, for example. According to a preferred embodiment, a gripper unit includes a gripper head, a shifting unit and a fastener or fastening means, wherein preferably a second movable component (which is described in greater detail below) is possible between the shifting unit and the fastener. The shifting unit provides constant shifting of the gripper head during a production process.

Furthermore, the gripper unit has means for interchangeable support, adjustment and spatial determination of the gripper head in a first transport direction at the gripper unit. According to a preferred embodiment of the invention, the means provide a vertical movement of the gripper head contrary to the gripper unit and/or the transport system.

According to a preferred embodiment, the means for interchangeable support, adjustment and spatial determination of the gripper head are arranged between the gripper head and the shifting unit. Alternatively, the means for interchangeable support, adjustment and spatial determination of the gripper head can be directly arranged between the gripper head and the transport system.

The means for interchangeable support, adjustment and spatial determination of the gripper head are preferably molded parts for forming a dovetail joint, wherein said molded parts can be determined by means of a clamping device in a spatial position. In particular, a dovetail section is provided at the gripper head, whereas the shifting unit or the transport system is provided with the corresponding counter piece. Alternatively, the dovetail section can be arranged at the shifting unit or at the transport system, of course, whereas the gripper head is provided with the corresponding counter piece forming a dovetail groove.

The means for interchangeable fastening are adjusted and fastened in a respective manner during a production downtime and remain during production in the determined position.

The clamping device can be a clamping screw, for example, wherein said clamping screw can be both determined at the molded part with the dovetail section, and at the corresponding counter piece. Said clamping device provides the fixation of the dovetail joint in the adjusted spatial position. Further known fixing means known to a person skilled in the art shall also be covered by the invention.

Besides, the means for interchangeable support, adjustment and spatial determination of the gripper head encompass preferably a limit stop for height adjustment and for easy replacement of the gripper head. According to a preferred embodiment, the limit stop is designed as an adjusting screw with which the axial run-out of the gripper head can be adjusted. In turn, the position of the limit stop can be fixed and determined by means of a laterally arranged clamping screw.

According to a further preferred embodiment, the gripper unit is furthermore provided with means for shifting in a second transport direction. Preferably, these means provide the horizontal shifting of the gripper head contrary to the transport system.

According to a preferred embodiment of the invention, the first transport direction of the gripper head and the second transport direction of the gripper head are perpendicular to each other. In particular, the first transport direction of the gripper head can provide a vertical movement and the second transport direction a horizontal movement.

The means for shifting in a second transport direction are preferably provided between the shifting unit and the fastening means, and encompass, for example, a guide rail, which enables a movement of the gripper head in direction of the fastening means already described above and/or in direction of the transport system, and from said transport system respectively.

In order to facilitate the movement in the second transport direction, the fastening means or the transport system are provided with elements, which engage into the guide rail of the shifting unit and are shiftable therein. Said elements can be rollers or the like, for example, which proceed in the guide rail of the shifting unit.

The distance between gripper head and transport system can be particularly varied by means of the second movable component. This is necessary, for instance, in order to avoid a collision when articles are transferred from one transfer starwheel to another transfer starwheel, or to a processing unit. For this purpose, rollers can be provided at the shifting unit and/or at the fastening means, which guide the gripper unit in special transport guide rails and thus always exactly determine the horizontal distance between gripper head and transfer system.

Furthermore the invention relates to a gripper head to be fastened at a transport system for supporting and transporting articles. The gripper head can be directly supported at the transport system, or by an already above-described dovetail joint via intermediate elements at the transport system. The intermediate elements can be, for example, the already described shifting unit and/or fastening means.

According to a preferred embodiment, the gripper head is provided with at least one curved roller and at least one tension spring for opening and closing the gripper arms. The curved roller is preferably arranged in an axial manner to the gripper arms. Two pivotable mounted rings are provided at the axis of the curved roller, wherein said rings operate in each case one lever per gripper arm, wherein the levers are provided in each case at the axes of rotation of the gripper arms.

Since further features of the gripper head were already described in great detail with respect to the above-mentioned gripper unit, a separate description is hence not necessary.

BRIEF DESCRIPTION OF THE DRAWINGS

Further features and advantages of the present invention shall now be described in greater detail according to the accompanying figures in the following detailed description. The dimensions of the individual elements to each other do not always correspond with the real dimensions since some forms are shown simplified and other forms are shown enlarged with respect to other elements for the sake of clarity.

DETAILED DESCRIPTION

Same elements refer to same reference numbers throughout the various figures. Furthermore, only reference numbers which are necessary for the description of the respective figure are shown in the various figures for the sake of clarity. The shown embodiments are only examples of how the method according to the invention can be designed and shall not be regarded as limiting the invention.

Figure 1:
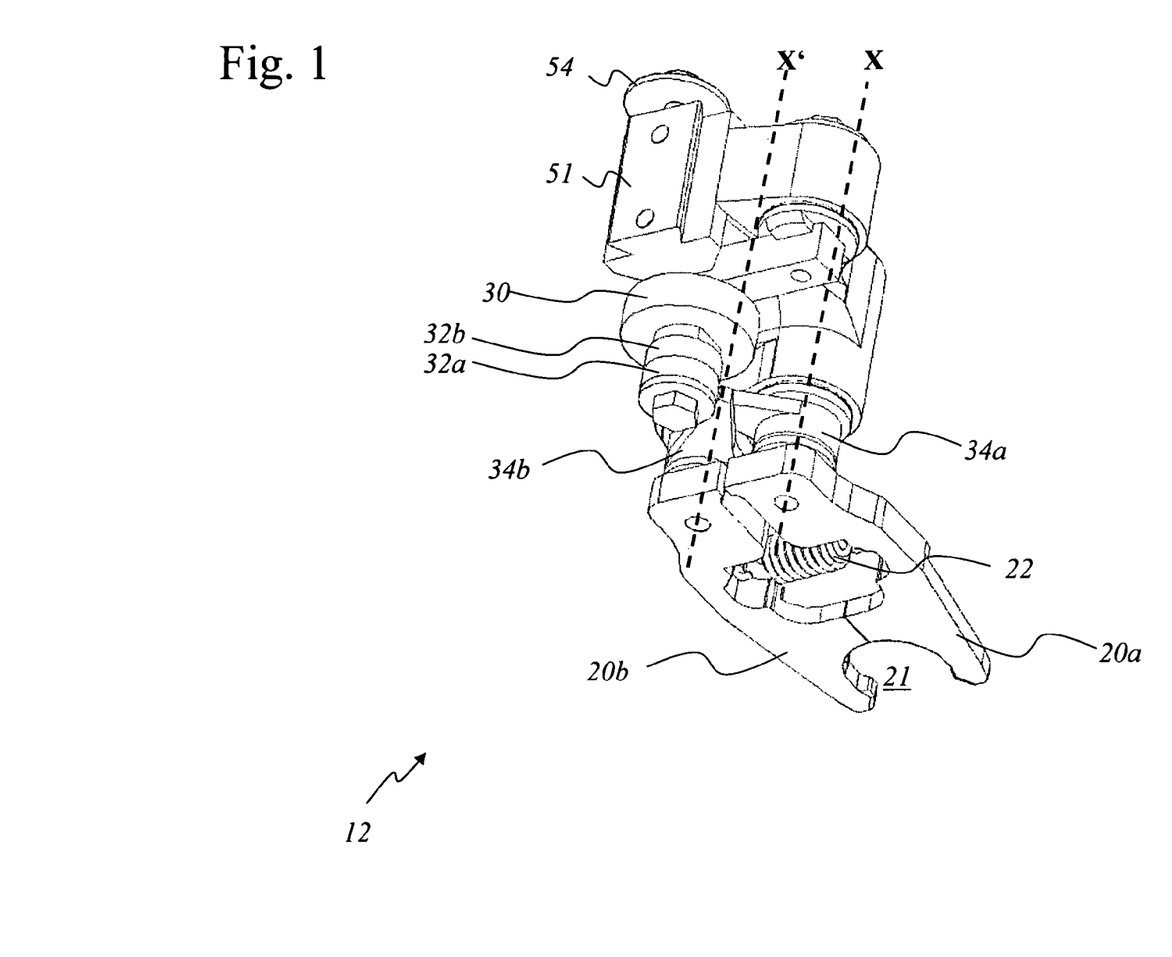
FIG. 1 shows a schematic view of a gripper head.
Figure 2:
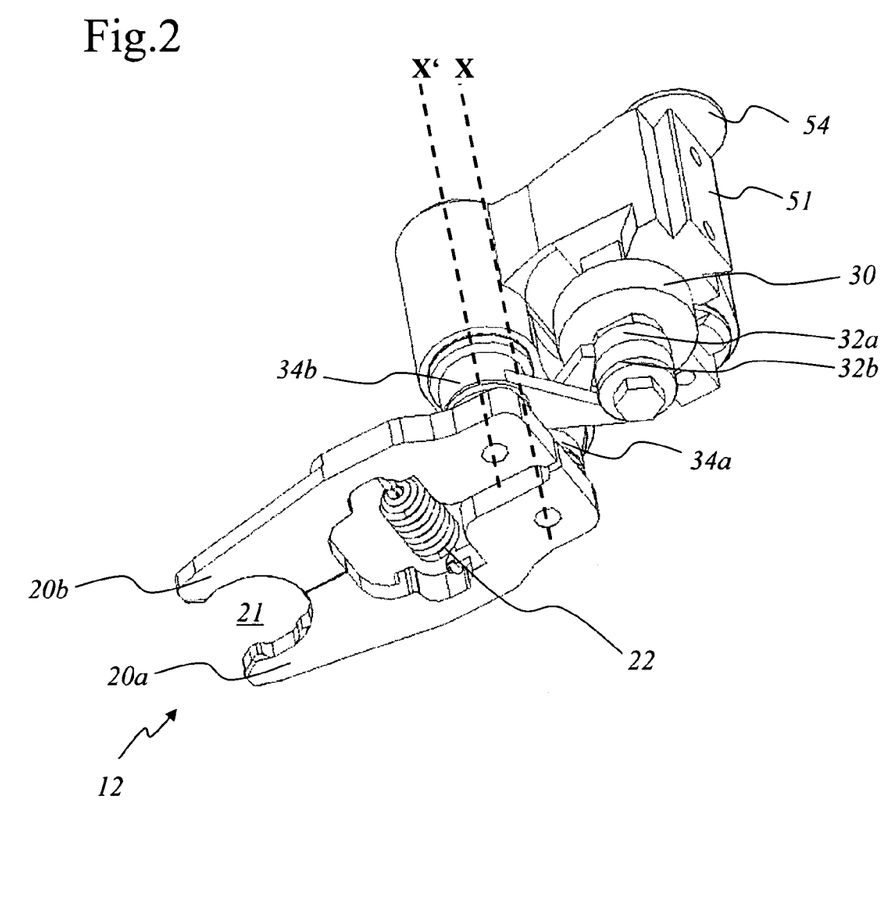
FIG. 2 shows a further schematic view of the gripper head.

FIG. 1 and FIG. 2 show in each case a schematic view of a gripper head 12 for supporting and transporting articles, particularly bottles (not shown), wherein the bottles are preferably gripped by gripper arms 20a, 20b below the enlargement at the bottle neck. Likewise it is possible that the gripping is carried out at the so called body of the container. This can be carried out, for instance, by using modified fastening elements.

The gripper head 12 has the two gripper arms 20a, 20b, wherein the opening 21 formed by the two gripper arms 20a, 20b is adjustable in a variable manner. This adjustment is preferably carried out by a curved roller 30, which is attached at pivotable rings 32a, 32b via two levers 34a and 34b. The pivotable rings 32a, 32b are directly connected with the gripper arms 20a, 20b via pivotal axis X and cause the opening of said gripper arms 20a, 20b. The closing of the gripper arms 20a, 20b is carried out via a spring element 22 which is arranged between the gripper arms 20a, 20b. The spring element 22 is preferably a tension spring and return spring respectively. The return spring can be replaced by other similar return elements, such as magnets or the like.

The opening mechanism for the gripper arms 20a, 20b is directly integrated at the gripper head according to the embodiment shown here. The opening mechanism is operated by a curved roller 30 which is arranged in an axial manner to the gripper arms 20a, 20b. At the axis of the curved roller 30 two pivotable mounted rings 32a, 32b are provided, which in each case operate the respective lever 34a, 34b of the left and right gripper arms 20a, 20b. Preferably, the pivotable mounted rings 32a, 32b are arranged at the axes of rotation X, X' of the gripper arms 20a, 20b.

Figure 3:
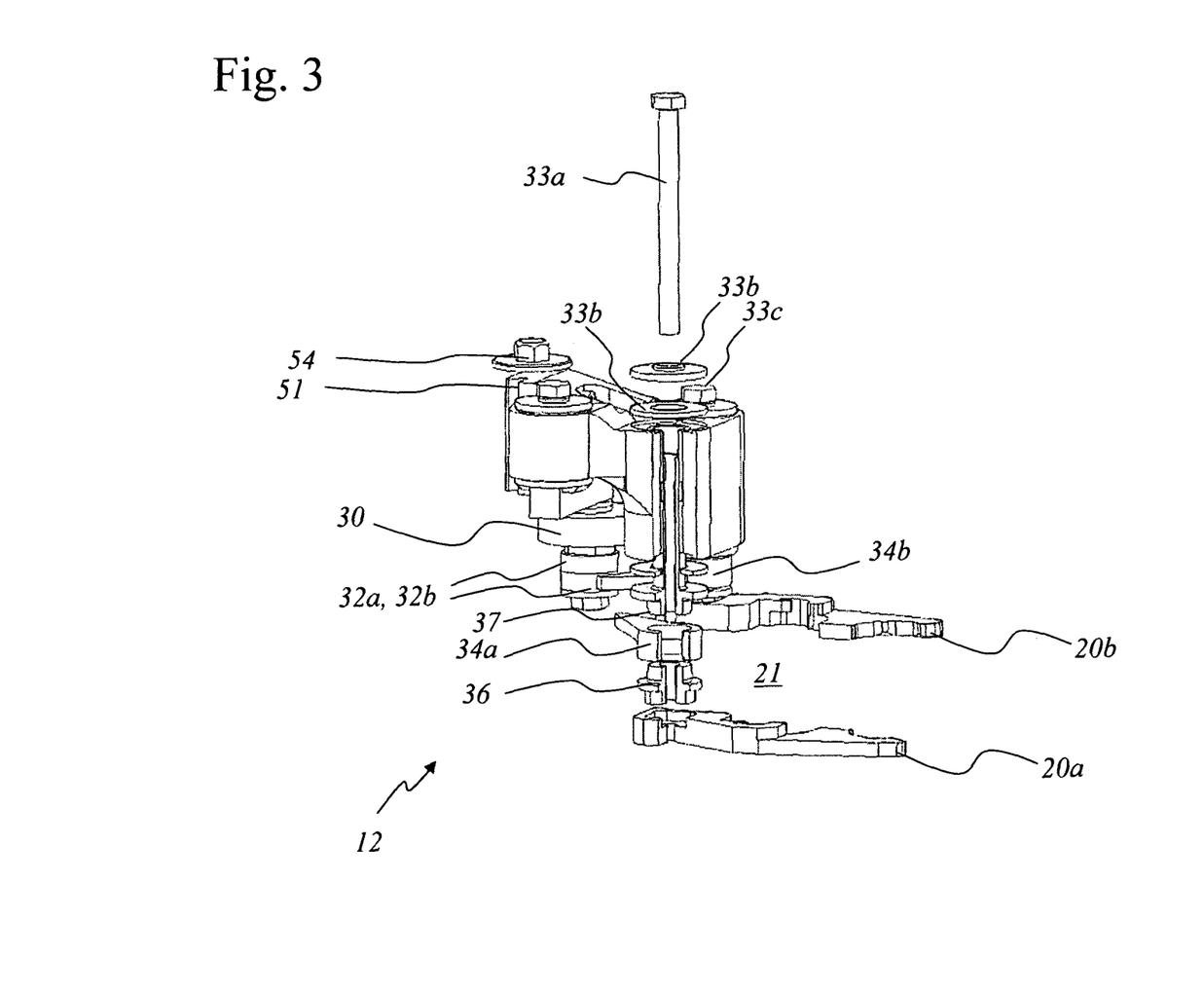
FIG. 3 shows a gripper unit in a front view.

For easily adjusting the position and for safety in the event of malfunction, the opening mechanism, which includes the curved roller 30, the levers 34a, 34b and the pivotable rings 32a, 32b, is provided with fasteners 36, 37 which are shown in FIG. 3, wherein said fasteners 36, 37 are provided in a cone-shaped manner between the respective axes of rotation X, X' of the gripper arms 20a, 20b and the levers 34a, 34b. Thus, the position of the curved roller 30 to the gripper arms 20a, 20b can be adjusted by correct positioned clamping of the cones at the levers 34a, 34b and at the fastener 36 when installing the gripper head 12. In the event of malfunction, particularly when it comes to a collision of the transported articles, a mechanic shift of the gripper head is carried out due to the high speeds, and the tapered connection slides through. However, the position can be easily adjusted again due to the chosen construction.

Such as clearly shown in FIGS. 1 and 2, the levers 34a, 34b are arranged in a crosswise manner seen from the gripper arms 20a, 20b. When the curved roller 30 moves in direction of the clamping center and in direction of the opening 21 respectively, it hence causes an opening of the gripper arms 20a, 20b. A spring element 22 arranged between the gripper arms 20a, 20b provides the closing of the gripper arms 20a, 20b due to the tension of the spring and thus an adjustment onto the articles to be transported, wherein said articles are particularly blown containers. By means of this mechanism, the articles to be transported can be supported in a firm and secure manner.

Furthermore, the gripper head 12 is provided with a dovetail section 51, which is arranged in a vertical manner, with a limit stop 54 for height adjustment and easy replacement of the gripper head 12. The limit stop 54 can be particularly an adjusting screw with which the axial run-out of the gripper head 12 can be adjusted. The adjusted position of the limit stop 54 can be secured against rotation by a laterally arranged clamping screw.

Figure 4:
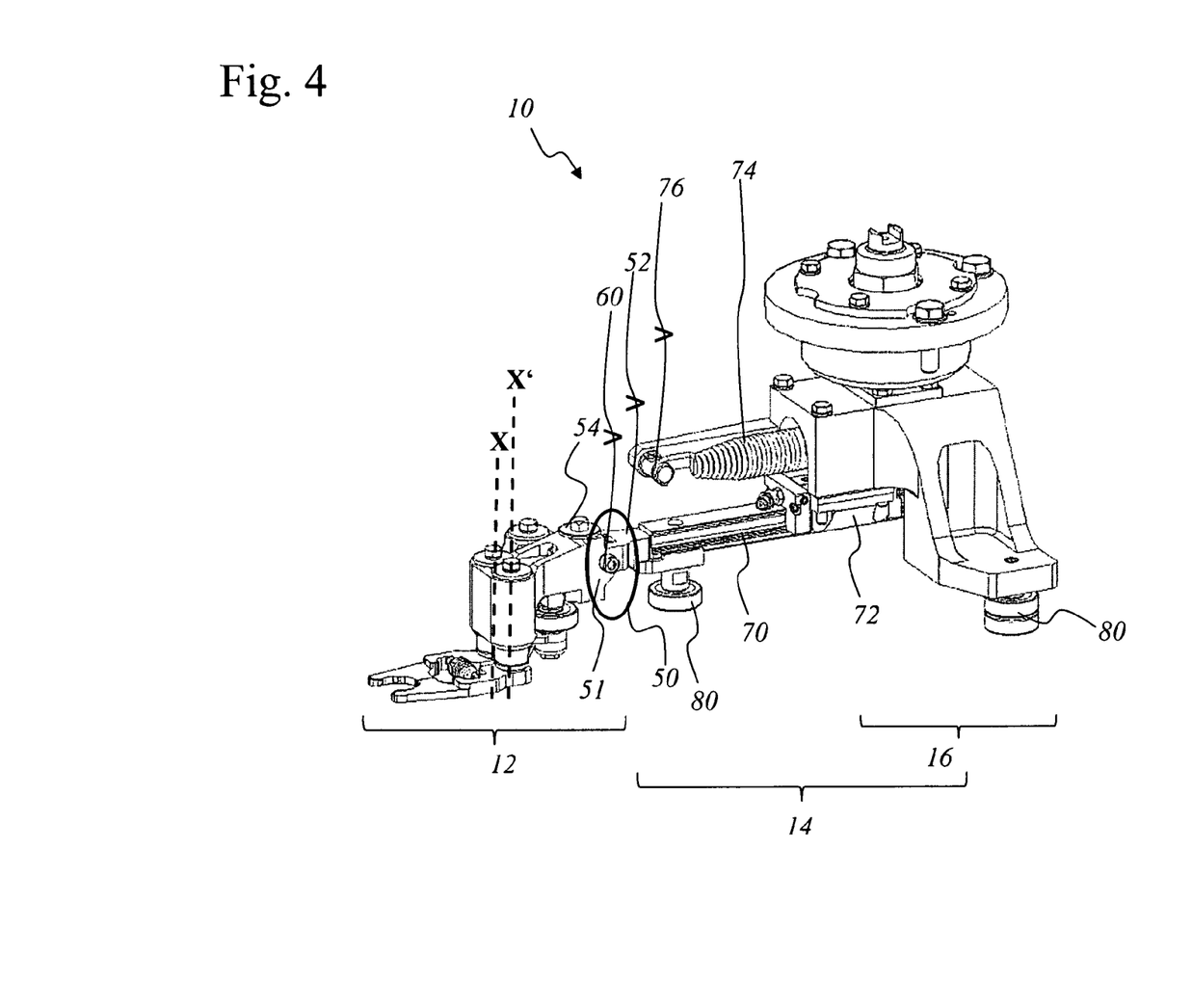
FIG. 4 shows a gripper unit in a rear view.
Figure 5:
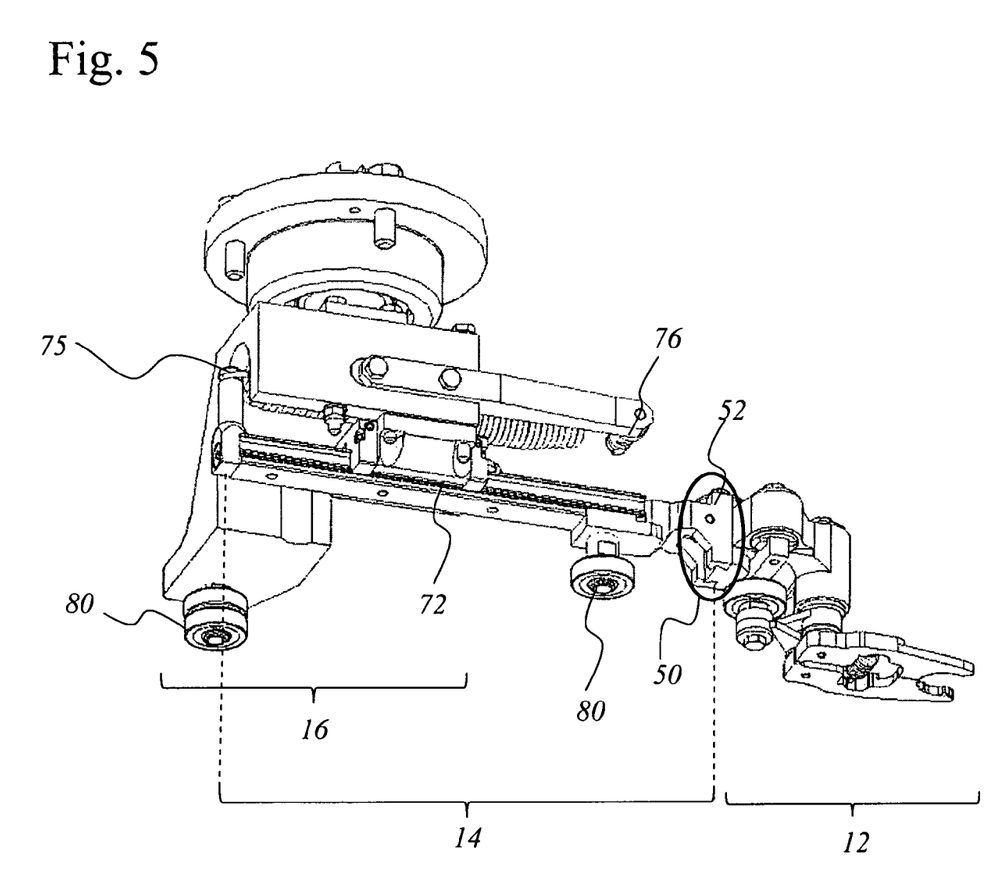
FIG. 5 shows the shift of a gripper unit in two transporting directions.
Figure 6:
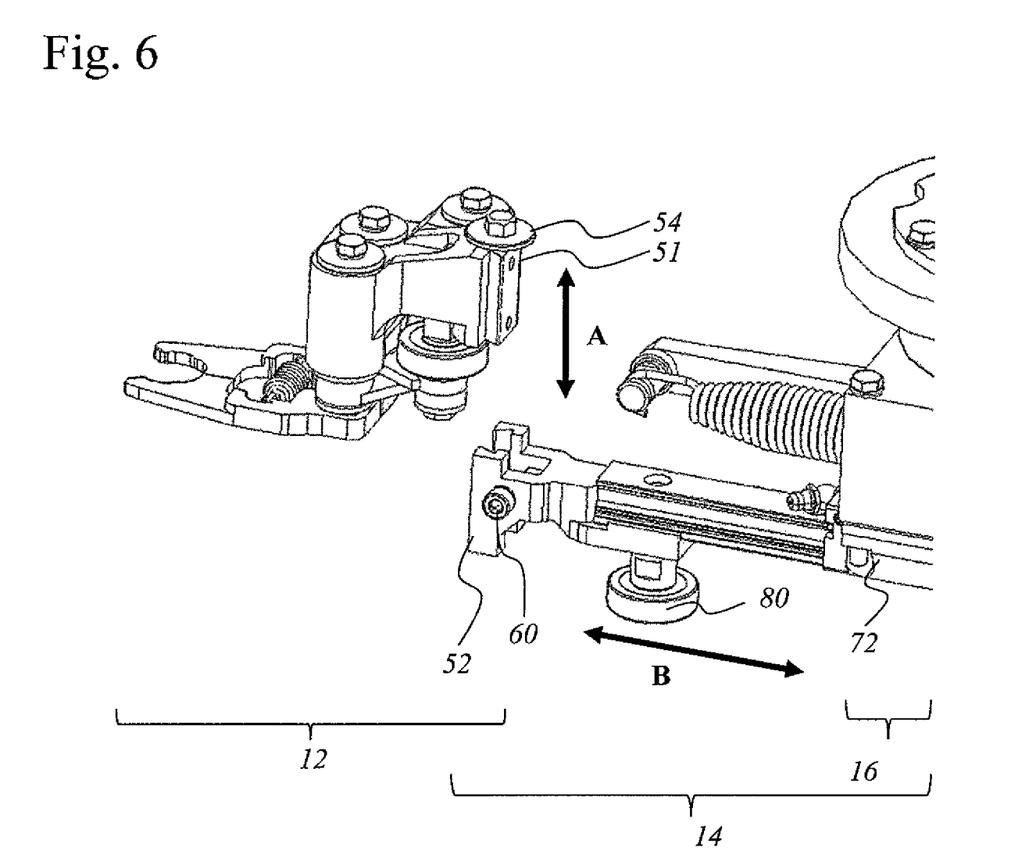
FIG. 6 shows the individual components of the gripper head in an exploded view.

The interaction of the dovetail section 51 with a corresponding counter piece 52, which forms a dovetail groove, and the forming of a respective dovetail joint 50 are shown in FIGS. 4 to 6.

FIG. 3 shows the individual components of the gripper head 12 in an exploded view. The figure particularly shows the construction of the levers 34a, 34b, the construction of the pivotable rings 32a, 32b which are connected with said levers 34a, 34b, wherein said levers 34a, 34b ensure the transmission of the shift movement onto the gripper arms 20a, 20b, and the determination of the pivoting rings 32a, 32b at the axes of rotation X, X' of the gripper arms 20a, 20b, wherein said axes of rotation comprises at least one screw 33a and two washers 33b in the embodiment shown here. Other possibilities for opening and closing the gripper arms 20a, 20b known to a person skilled in the art shall also be covered by the invention.

Furthermore, the cone-shaped fastener 36, 37 is exposed, which serves on the one hand to adjust the position of the levers easily and on the other hand provides security in the event of malfunction.

FIG. 4, FIG. 5 and FIG. 6 show in each case a gripper unit 10 which includes a gripper head 12, a shifting unit 14 and a fastener 16.

The gripper head 12 is provided with a dovetail section 51 which is arranged in a vertical manner and wherein said dovetail section 51 grips into a corresponding counter piece 52 defining a dovetail groove at the shifting unit 14 and thus forms a dovetail joint 50. The corresponding counter piece 52 is provided with a clamp 60, for example with a clamping screw. When said clamp 60 is released, then the height of the gripper head 12 can be shifted easily. When the clamp is tightened again, then the position of the gripper head is determined contrary, i.e with respect to, to the shifting unit and thus also determined spatially contrary to the transport system.

Furthermore, the whole gripper head 12 can be removed and replaced by another gripper head 12, which is likewise provided with a similar dovetail section 51, wherein said dovetail section 51 grips in a positive manner into the corresponding counter piece 2 of the shifting unit 14. Thus, a simple exchange of the gripper head 12 is possible.

Hence, a defect gripper head 12 can be easily replaced or another gripper head 12 can be installed, which is adjusted onto the articles to be processed, if necessary. This is necessary, for example, in the event of supporting and transporting articles with a significantly different diameter so that the usage of another gripper head 12 is mandatory.

The fastener 16 serves as a connection element between the unit, which includes the gripper head 12 and the shifting unit 14, and the transport system, wherein said transport system is an infeed and discharge starwheel respectively or the like, for example. The fastener 16 is mounted on the transport system with a rotary degree of freedom, which enables an additional rotational movement relative to the transport system besides the linear movement of the gripper head.

FIG. 6 clarifies the possibilities of the vertical possibility of adjustment A via a dovetail joint 50, which includes the dovetail section 51 at the gripper head 12 and the respective counter piece 52 defining a dovetail groove at the shifting unit 14, as well as a horizontal possibility of adjustment B between the shifting unit 14 and the fastener 16, which influences the distance between gripper head and transport system.

The shifting unit 14 is arranged between the gripper head 12 and the fastener 16 in the embodiment shown. The shifting unit 14 is constructed such that a linear movement or shifting movement is possible in horizontal direction. The shifting unit 14 is preferably provided with a guide rail 70. The fastener 16 is provided with corresponding sliders 72, which engage into the guide rail 70 and are shiftable therein.

The linear movement of the shifting unit 14, that is the shifting movement in particular, is supported particularly by a tension spring 74, which enables the simplified retraction into a first original position. The tension spring 74 is arranged at the rotating fastener 16 with its rear suspension point 76. The front suspension point 75 of the tension spring 74 is arranged at the shifting unit 14.

When the shifting unit 14 is arranged, for example, at a rotary transfer starwheel, then the tension spring 74 supports in addition the centrifugal force which impacts onto the shifting unit 14 and which is caused by the rotation of the starwheel.

In particular, the distance between gripper head 12 and transport system can be varied by the second moving component. This is necessary in the event of preventing a collision when articles are transferred from one transfer starwheel to another transfer starwheel, or to a processing unit. For this purpose, rollers 80 can be provided for example at the shifting unit 14 and/or at the fastener 16, wherein said rollers 80 serve for guiding the gripper unit in special transport guide rails and thus always exactly determine the horizontal distance between gripper head 12 and transfer system.

The invention has been described with reference to preferred embodiments. It is also conceivable to a person skilled in the art, however, to make changes and modifications to the invention without leaving the scope of protection of the appended claims.

LIST OF REFERENCE NUMBERS 10 gripper unit
12 gripper head
14 shifting unit
16 fastening means
20a/b gripper arms
21 Opening
22 spring element
30 curved roller
32a/b pivotable ring
33a Screw
33b Washer
33c screw nut
34a/b Levers
36 cone-shaped fastener
37 cone-shaped fastener
50 dovetail joint
51 dovetail groove
52 corresponding counter piece to the dovetail groove
54 limit stop
60 Clamping
70 guide rail
72 Slider
74 tension spring
75 front suspension point
76 rear suspension point
80 Roller A vertical possibility of adjustment
B horizontal possibility of adjustment
X/X' axes of rotation

What is claimed is:

1. A gripper unit for transport systems for supporting and transporting articles, comprising:
   a gripper head with at least two gripper arms openable and closable against each other, the at least two gripper arms forming an opening for supporting an article to be gripped;
   a shifting unit supported in a flexible manner via a fastener to or directly supported at a transport system, the shifting unit movable in a horizontal direction to shift the gripper head horizontally during a production process; and
   means for interchangeable support, adjustment and spatial determination of the gripper head in a vertical direction at the gripper unit, said means being arranged between the gripper head and the shifting unit or between the gripper head and the transport system, wherein the means for interchangeable support, adjustment and spatial determination of the gripper head include a limit stop.

2. The gripper unit as recited in claim 1 wherein the means for interchangeable support, adjustment and spatial determination of the gripper head includes molded parts forming a dovetail joint and a clamping device.

3. The gripper unit as recited in claim 1 wherein the gripper head includes levers for opening the gripper arms and has cone-shaped fasteners for adjusting a position of the levers and for safety in the event of malfunction.

4. A gripper head for fastening at an transport system for supporting and transporting articles, comprising:
   at least two gripper arms openable and closable against each other, the at least two gripper arms forming an opening for supporting an article to be gripped, the gripper head including means for interchangeable support, adjustment and spatial determination in a vertical direction with respect to the transport system wherein a limit stop is allocated to the means for interchangeable support, adjustment and spatial determination.

5. The gripper head as recited in claim 4 wherein the means for interchangeable support, adjustment and spatial determination includes a fastening element for forming a dovetail joint with the transport system.

6. The gripper head as recited in claim 4 wherein the means for interchangeable support, adjustment and spatial determination includes a clamping device.

7. The gripper head as recited in claim 4 further comprising levers for opening the gripper arms and cone-shaped fasteners for easily adjusting the position of the levers and for safety in the event of malfunction.

8. A gripper unit for transport systems for supporting and transporting articles, comprising:
   a gripper head with at least two gripper arms openable and closable against each other, the at least two gripper arms forming an opening for supporting an article to be gripped;
   a shifting unit supported in a flexible manner via a fastener to or directly supported at a transport system, the shifting unit movable in a horizontal direction to shift the gripper head horizontally; and
   an adjustable support permitting interchangeability and spatial determination of the gripper head in a vertical direction at the gripper unit, said support being arranged between the gripper head and the shifting unit or between the gripper head and the transport system, wherein the adjustable support permitting interchangeability and spatial determination of the gripper head includes a limit stop.

9. The gripper unit as recited in claim 8 wherein the shifting unit includes a guide rail.

10. The gripper unit wherein the adjustable support permits a vertical adjustment of the gripper head with respect to the shifting unit.

11. The gripper unit as recited in claim 10 wherein the adjustable support includes a releasable clamp permitting adjustment of a height of the gripper head in a released position and setting the height in a tightened position.

12. The gripper unit as recited in claim 8 wherein the adjustable support supports the gripper head on the shifting unit.

13. The gripper unit as recited in claim 8 wherein the adjustable support permits continuous adjustment of the gripper head between at least two positions in the vertical direction.

14. The gripper unit as recited in claim 1 wherein the means for interchangeable support, adjustment and spatial determination supports the gripper head on the shifting unit.

15. The gripper unit as recited in claim 8 wherein the means for interchangeable support, adjustment and spatial determination permits continuous adjustment of the gripper head between at least two positions in the vertical direction.

16. The gripper unit as recited in claim 4 wherein the gripper arms support a bottle or preform for transport.

* * * * *